(12) United States Patent
Chakradhar et al.

(10) Patent No.: US 8,286,172 B2
(45) Date of Patent: Oct. 9, 2012

(54) SYSTEMS AND METHODS FOR IMPLEMENTING BEST-EFFORT PARALLEL COMPUTING FRAMEWORKS

(75) Inventors: Srimat Chakradhar, Manalapan, NJ (US); Anand Raghunathan, West Lafayette, IN (US); Jiayuan Meng, Charlottesville, VA (US)

(73) Assignee: NEC Laboratories America, Inc., Princeton, NJ (US)

( * ) Notice: Subject to any disclaimer, the term of this patent is extended or adjusted under 35 U.S.C. 154(b) by 839 days.

(21) Appl. No.: 12/399,195

(22) Filed: Mar. 6, 2009

(65) Prior Publication Data

US 2010/0088492 A1    Apr. 8, 2010

Related U.S. Application Data

(60) Provisional application No. 61/102,181, filed on Oct. 2, 2008.

(51) Int. Cl.
*G06F 9/46* (2006.01)
(52) U.S. Cl. ......... 718/102; 718/103; 718/104; 718/106
(58) Field of Classification Search ........................ None
See application file for complete search history.

(56) References Cited

U.S. PATENT DOCUMENTS 7,418,705 B2 * 8/2008 Kanai et al. .................... 718/102
7,444,638 B1 * 10/2008 Xu ................................ 718/104

OTHER PUBLICATIONS

Burns et al; Jorvik: A Framework for Effective Scheduling, May 16, 2001.*
Rajkhowa, Priyanka; Exploiting Soft Computing for Real Time performance, Aug. 15, 2006.*
De Oliverira, R.S. et al; Scheduling imprecise tasks in real-time distributed systems; May 2001.*
Stankovic et al; On using the Spring Kernel to support real-time AI applications, Jun. 14-16, 1989.*

* cited by examiner

*Primary Examiner* — Meng An
*Assistant Examiner* — Bing Zhao
(74) *Attorney, Agent, or Firm* — Joseph Kolodka; James Bitetto

(57) ABSTRACT

Implementations of the present principles include Best-effort computing systems and methods. In accordance with various exemplary aspects of the present principles, a application computation requests directed to a processing platform may be intercepted and classified as either guaranteed computations or best-effort computations. Best-effort computations may be dropped to improve processing performance while minimally affecting the end result of application computations. In addition, interdependencies between best-effort computations may be relaxed to improve parallelism and processing speed while maintaining accuracy of computation results.

17 Claims, 3 Drawing Sheets

SYSTEMS AND METHODS FOR IMPLEMENTING BEST-EFFORT PARALLEL COMPUTING FRAMEWORKS

RELATED APPLICATION INFORMATION

This application claims priority to provisional application Ser. No. 61/102,181 filed on Oct. 2, 2008, incorporated herein by reference.

BACKGROUND

1. Technical Field

The present invention generally relates to computer processor computation management, and more particularly, to systems and methods for improving processing performance.

2. Description of the Related Art

Mainstream parallel computing has recently become a popular processing architecture due to advances in semiconductor technology, e.g., Moore's Law, and its expected potential for continued improvement in computation capability. However, many applications are concomitantly managing an explosive growth in input data and implementing increasingly sophisticated algorithms to address it amidst a rising demand for real-time responses. Recognition and mining (RM) applications, for example, represent a significant class of such emerging applications that are anticipated to run on future multi-core and many-core computing platforms. Thus, for the foreseeable future, a significant gap between the computational requirements of workloads and the capabilities of emerging multi-core and many-core platforms is expected.

The primary approach to addressing increasing computational workloads has been to design more efficient hardware platforms, such as multi-core and many-core processors, or hardware accelerators. Notwithstanding these hardware advances, the explosion in data and complexity of algorithms that process it ensure that computation will likely exceed processing capability.

Various algorithm-specific techniques exist that improve the efficiency of RM algorithms so as to achieve the same or nearly the same result with less work by reducing the number of iterations or computations required to attain the same result. Prior work in parallel computing has addressed efficient utilization of parallel computing platforms for 1M applications through parallel programming languages, compilers and parallel libraries. Additionally, real-time scheduling of computations on processing platforms has exploited the fact that parts of an application are "optional" and can therefore be scheduled only if and when the computational capability of the platform allows for them to be executed. This is referred to as the "approximate computation" model. In the approximate computation model, a user is required to specify which computations are optional.

However, prior art work fails to recognize and utilize the full benefits of dropping computations and removing interdependencies of computations, as discussed herein below. Rather than proactively dropping and re-configuring computation sequence and performance and exploiting the forgiving aspects of applications, prior work approaches dropping or re-configuring computations as actions that should be avoided. Accordingly, there is a need for improving processing performance and efficiency by developing the forgiving nature of applications to address the problem of increased workloads in processing systems.

SUMMARY

Methods and systems in accordance with various implementations of the present principles address the deficiencies of the prior art by implementing a best-efforts (BE) architecture within processing platforms. In accordance with exemplary implementations of the present principles, applications may be enhanced by adding a best-efforts layer between applications and processing platforms that are configured to service computations requested by the applications. The best-efforts layer may be configured to classify application computations as either guaranteed applications or best-effort computations, which may be proactively dropped. Further, in exemplary implementations, the computations may be proactively dropped despite the existence of processing capability to execute them.

In addition, the computations that are dropped may be selected by determining the effect the dropped computations have on an end result of a group of computations requested by the application. For example, computations that have minimal impact on the end result may be dropped to improve processing performance.

According to other exemplary aspects of the present principles, the best-effort applications may additionally or alternatively have removable interdependencies. The sequence of best-effort computations may be reconfigured such that an increased number of computations may be performed in parallel so that processing speed is improved.

In accordance with other exemplary embodiments of the present principles, a parallel template may be provided to a user so that the user may generate an application by selecting filtering criteria for determining best-effort application computations and/or dependency relaxation criteria for re-ordering execution of application computations such that dependencies between them are not maintained. Further, a parallel library including best-effort strategies may be provided to a user to facilitate criteria selection. The parallel library may also include associations between best-effort strategies and application classes. After the template is completed, the generated application may be executed to improve processing performance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Various implementations of the present invention provide efficient and scalable parallel, best-effort computing methods and systems. One concept behind exemplary implementations of the invention is to some extent analogous to best-effort packet delivery in networking systems. For example, the Internet uses a "best-effort" model for packet transport and delivery, which has proven to be a very scalable approach to supporting the explosion in traffic and network complexity. No guarantees are offered when, or even if, a packet will be delivered. Although similar in some respects to best-effort packet transmission, best-effort computing systems in accordance with exemplary implementations of the present principles employ very different techniques.

For example, in exemplary best-effort computing system architectures of the present principles, the computations to be executed on a computing platform may be broken into smaller computation units, which may be processes, tasks, threads, etc. A best-effort layer, which may be a software layer, presents a fundamentally different view of the computing platform in that it is deemed unreliable—computation units may be dropped, i.e., not executed. It is not known a priori which computation units will be executed and which will be dropped. If the computation unit is guaranteed to be executed, it may be presented to the best-effort layer through a separate guaranteed sub-layer that is part of the best-effort layer. Applications may be adapted to this new computing model by re-organizing their computations into those that need to be executed, i.e., guaranteed computations, and those that may be dropped at the discretion of the best-effort software layer.

Thus, application computations may be restructured into two categories: optional computations that may be dropped by a computing platform, if necessary, and mandatory computations that are guaranteed to be completed in order to maintain integrity of the output results. Best-effort computing in accordance with the present principles can be used to not only reduce computational workload but also to eliminate dependencies between computations and further increase parallelism.

Figure 1:
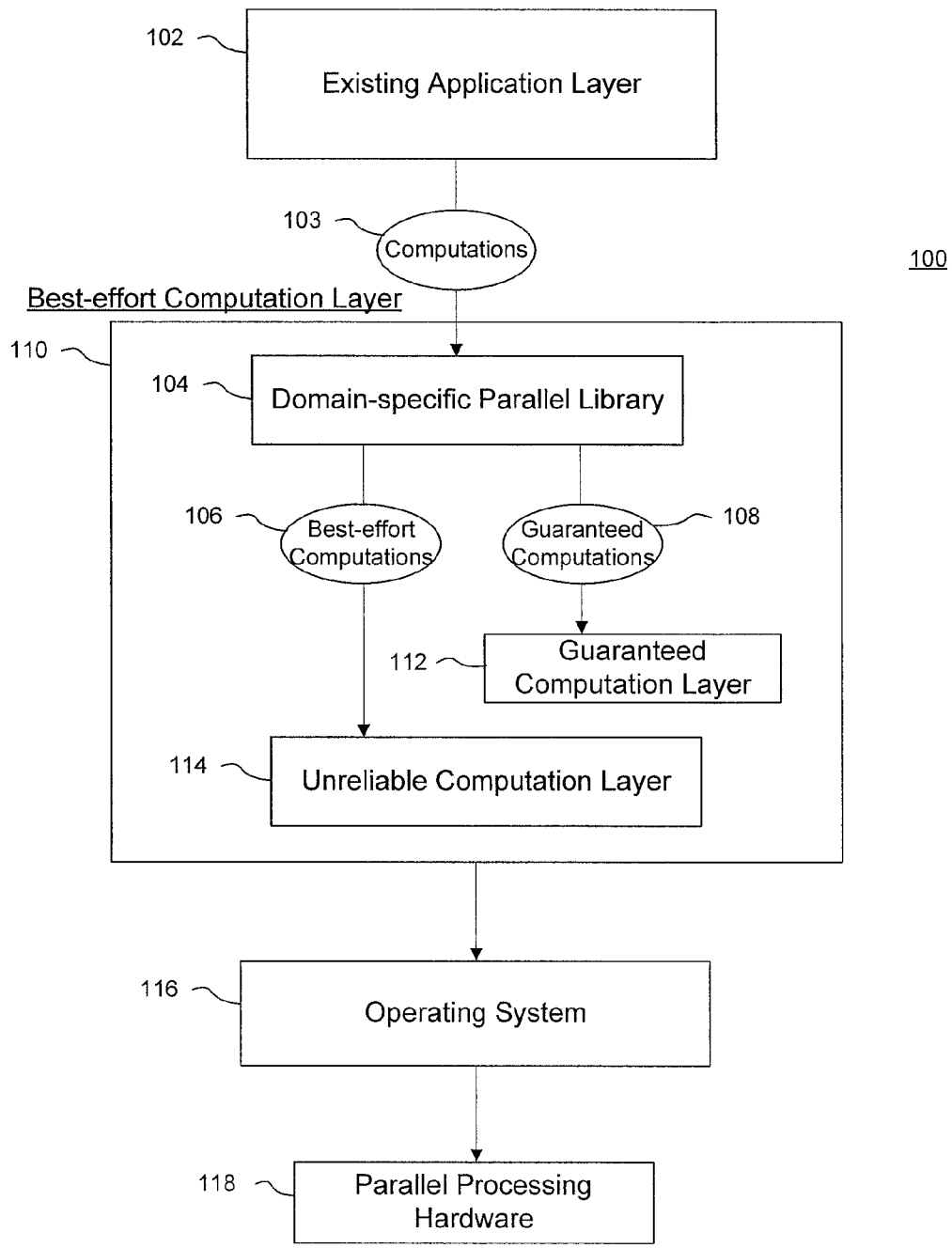
FIG. 1 is a high-level block/flow diagram of an exemplary best-effort parallel processing system embodiment of the present principles.

Referring now in detail to the figures in which like numerals represent the same or similar elements and initially to FIG. 1, a high-level block/flow diagram of an exemplary best-effort parallel computing system 100 in accordance with an implementation of the present principles is illustrated. System 100 may include an application layer 102 including one or more existing applications, an optional domain-specific parallel library 104, a best-effort computation layer 110 that may be configured to classify computations as best-effort computations 106 and guaranteed computations 108 and includes a guaranteed computation layer 112 and an unreliable computation layer 114, an operating system 116 and parallel processing hardware 118.

In system 100, an application in layer 102 may direct computation requests 103 to a processing platform, which may include parallel processing hardware 119 and an operating system 116. A fundamental difference between system 100 and prior art systems is the relationship between applications and a computing platform. As mentioned above, the computing or processing platform is viewed as unreliable and it may drop i.e., not execute, some of the computations requested by the application, which may include a collection of computations. By sacrificing guarantees of applications, it is possible to build simpler, faster, and more scalable processing platforms by reserving the right to proactively drop computations due to a variety of reasons, such as to improve performance.

Furthermore, as discussed herein below, applications can leverage best-effort computing in the following ways: (1) drop computations to reduce overall workload and improve performance, and/or (2) relax dependencies between tasks, leading to higher performance through increased task parallelism. With regard to relaxed dependencies, for example, often times, one computation is deemed by an application to be dependent on a previously computed computation. Thus, for certain classified best-effort computations, the dependency may be removed so that the two computations may be performed in parallel as opposed to sequential performance to improve processing speed and efficiency while minimally affecting the end-result of the computations, as discussed below. Accordingly, computations may be re-ordered such that dependencies between them are not maintained. Although a chain of two interdependent computations is discussed for simplicity purposes, it should be noted that interdependencies between computations of any chain length may be altered and/or removed in various exemplary implementations of the present principles.

To leverage best-effort computing, a best-effort computation layer 110 may be configured to intercept computation requests originating from an application layer 102 and directed to a computing platform. In this way, the best-effort computation layer 110 may be added to a processing system and implement a best-effort architecture to exploit the improved processing performance obtained by dropping computations and/or relaxing interdependencies between applications and, at the same time, achieve an acceptable end-result. In certain exemplary implementations, the best-effort computation layer may be added to retrofit existing applications and improve processing performance. In addition, the best-effort computation layer may be implemented as a parallel run-time library that accepts computations from a parallel-programming application programming interface (API). Further, the best-effort computation layer may employ a library or other means to identify the application type or class by evaluating the computations requested. After identifying the application type or class, the library or other means may also be utilized to implement one or more appropriate "best-effort strategies," discussed below, thereby improving processing performance by dropping computations or relaxing interdependencies between calculations, for example.

Computations requested by the application layer 102 may be classified into guaranteed computations 108, which are assuredly executed by the computing platform, and best-effort computations 106, whose execution may be sacrificed in the interest of performance. For example, best-effort computations are computations that need not be executed and/or are computations that have relaxed interdependencies. It should be noted that best effort computations may be dropped despite the existence of processing capability to execute them. Processing capability may, for example, refer to the ability of a processing system to execute computations under a current workload or the ability of a processing system to execute computations within a certain time threshold. Additionally, the classification may be conducted by the best-effort computation layer 110 with or without using an optional domain-specific parallel library 104. The domain-specific parallel library provides programming interfaces that are higher in abstraction than typical parallel programming models such as pthreads, OpenMP, and MPI, easing the task of parallel programming. Another purpose of the domain-specific parallel library is to facilitate separation of application computations into best-effort and guaranteed computations.

The best-effort computation layer 110 may be configured to manage the execution of the application computations on the underlying computing platform by directing guaranteed applications to the computing platform and dropping at least one computation based on a determination of an effect the dropped computations have on an end result of a set of application computations. For example, guaranteed and best-effort computations may be determined or selected based on any one of the "best-effort strategies" or any combination of "best-effort strategies," discussed herein below, which enable the selection of best-effort computations that have a minimal effect on an end result of a set of application computations.

Furthermore, it should be noted that the best-effort computation layer may be configured to select computations that have removable interdependencies and to relax or remove interdependencies between computations based on a Dependency Relaxation best-effort strategy, discussed below. In this way, the best-effort computation layer may select requested computation interdependencies to be relaxed based on a determination of an effect that the relaxed interdependencies have on the end result of a set of application computations such that a total number of computations executed in parallel in at least one iteration is increased.

It should also be noted that guaranteed computations are passed through the best-effort layer onto the underlying computation platform, which executes them without any need for re-scheduling. Further, like the TCP protocol in computer networking, the best-efforts layer, in certain exemplary implementations, may also implement a mechanism to ensure reliable execution of a mandatory computation by repeated re-scheduling of the mandatory computation. It should be understood that mandatory applications may comprise both guaranteed computations and any best-effort computations that are chosen to be directed to a computing platform. Thus, the best-effort layer may be configured to monitor computation execution status and reinitiate the execution of mandatory computations which have not been completed.

Additionally, the best-effort computation layer may optionally include a guaranteed computations layer 112 and an unreliable computation layer 114. Here, after computation classification, the guaranteed computation layer 112 may receive guaranteed computations and transmit them directly to the operating system 116 and/or the parallel processing hardware 118 for execution. The best-effort computations may be transmitted to the unreliable computation layer, which may be configured to drop computations and/or relax dependencies, as discussed above. Any computations that are not dropped are passed to the computing platform for execution.

Figure 2:
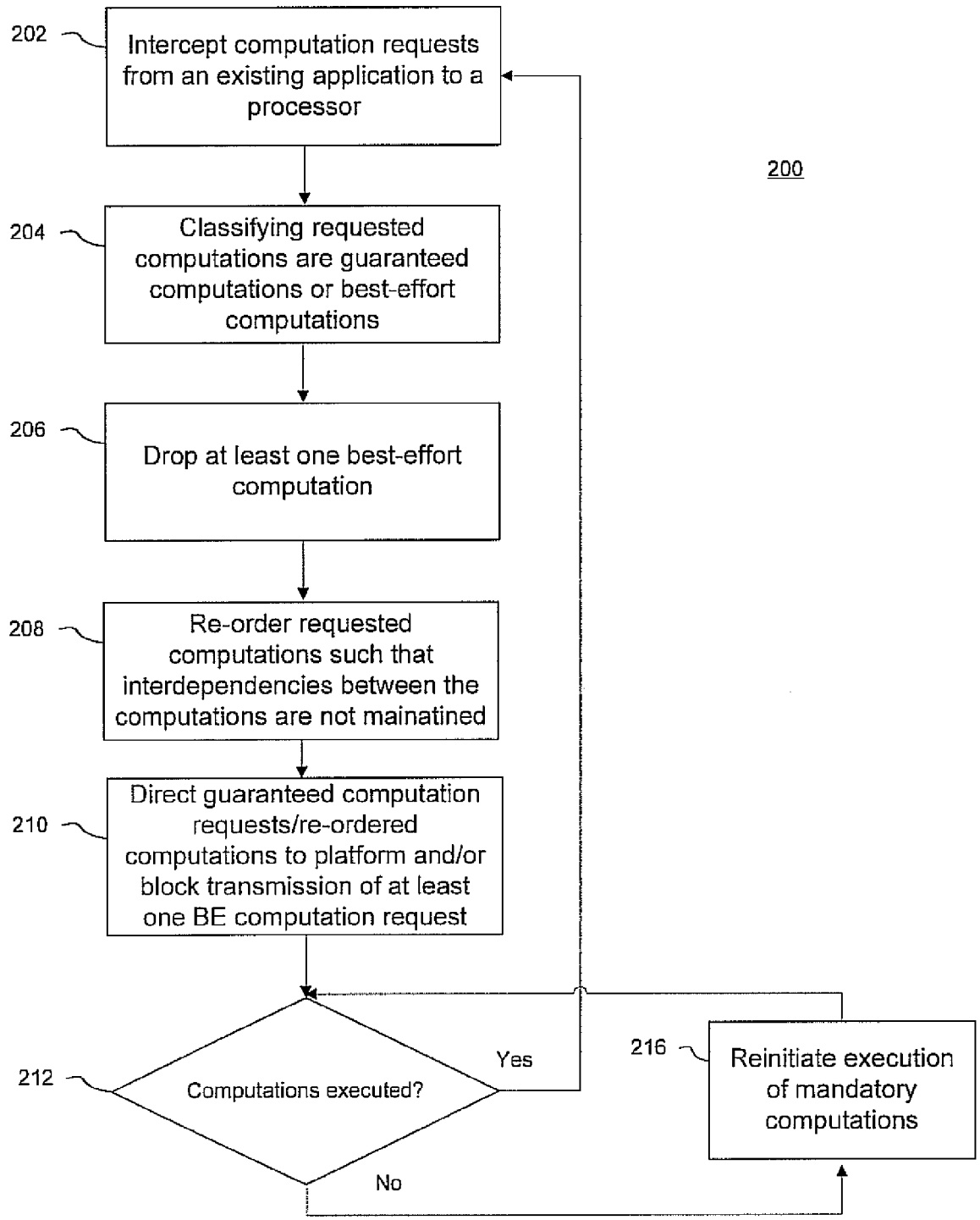
FIG. 2 is a high-level block/flow diagram of an exemplary method for implementing a best-effort architecture within a computing system in accordance with aspects of the present principles.

Referring now to FIG. 2 with continuing reference to FIG. 1, a high-level block/flow diagram of a method 200 for implementing a best-effort architecture within a computing system in accordance with an exemplary embodiment of the present principles is illustrated. Method 200 may begin at step 202 by intercepting computation requests from an application to a processing platform. For example, the best-effort computation layer 110 of FIG. 1 may be-intercept computation requests from application layer 102 that are directed to the computing or processing platform, as discussed above.

At step 204, computations may be classified as either guaranteed computations or best-effort computations. Requested computations may be determined to be guaranteed applications or best-effort computations, for example, as discussed above with respect to system 100. For example, guaranteed applications are assuredly executed by the processor while best-effort-computations are either or both computations that need not be executed and computations that have relaxable interdependencies in that they may be re-ordered without maintaining interdependencies. Additionally, best-effort computations may be dropped despite the existence of processing capability to execute the best-effort computations. Guaranteed computations and best-effort computations may be determined or selected by implementing any one of the "best-effort strategies" or any combination of "best-effort strategies," as discussed herein, to improve processing performance.

Optionally, at step 206, at least one best-effort computation may be dropped based on a determination that the dropped computations have minimal impact on the end result of a set of application computations. For example, as stated above, one or more best-effort strategies may be implemented to improve processing performance.

Optionally, at step 208, interdependencies between requested computations may be relaxed based on a determination of an effect that the relaxed inter-dependencies have on the end result of a set of application computations such that a total number of computations executed in parallel in at least one iteration is increased. For example, the interdependencies may be relaxed or removed by implementing a Relaxed Dependency best-effort strategy, as discussed herein below.

Alternatively to or in addition to step 208, step 210 may be performed, in which guaranteed computation requests may be directed to the processing platform and the transmission of at least one best-effort computation request to the processing platform may be blocked to improve processing performance. For example, as discussed above with respect to FIG. 1, the best-effort computation layer 110 may direct guaranteed computations to the processing platform and may drop best-effort computations. In addition to transmitting the guaranteed transmission to the processing platform, best-effort computations that are re-ordered such that dependencies between them are not maintain may also be transmitted to the processing platform. The best-effort computations with relaxed dependencies also may be transmitted while other best-effort computations are dropped.

Optionally, at step 212, the execution status of computations may be monitored. For example, the best-effort computation layer 110 may poll the computing platform to determine whether guaranteed computations have been executed. If they have been executed, then the process may continue to optional step 202-2-1-6. Otherwise, the process may continue to optional step 216-244 in which the execution of computations that have not been completed may be reinitiated.

Optionally, at step 216, computation processing may be terminated when the percentage of input data falls below a threshold. For example, computations processing may be terminated in accordance with a Convergence-based pruning best-effort strategy, which is discussed in more detail below.

Thereafter, processing may continue to step 202, in which a new batch of computation requests is intercepted.

According to various exemplary implementations of the present principles, in order to ease programming of best-effort applications, a programming template that inherently embodies a best-effort scheme and identifies best-effort and guaranteed computations may be provided to a programmer. The programming template includes a broad skeletal structure that may be employed for a variety of different classes of applications to facilitate implementation of best-effort computing on a wide spectrum of application types.

Programming templates as disclosed herein may permit the application programmer to easily experiment with a variety of "best-effort strategies," which specify optional computations and criteria for when they can be dropped or when computation interdependencies may be relaxed. Furthermore, the best-effort layer, discussed above, may be configured to implement these best-effort strategies and manage the execution of computations that are not dropped. In addition, the best-effort strategies may be implemented as libraries that allow application programmers to easily experiment with them.

In accordance with exemplary embodiments of the present principles, program templates may be employed to implement a best-effort (BE) architecture to iterative convergence paradigm algorithms, wherein, a parallel computation is performed in an iterative manner until a convergence or termination condition is satisfied. One basic example of a programming template for iterative-convergence algorithms that implements a best-effort computing scheme is shown below in Table 1.

TABLE 1

```
Template algorithm:
Iterate
{
    Mask[0:M] = filter(. . .);
    parallel_iterate(i=0 to M with mask [0:M] batch P)
    . . . .
    . . . .
} until converged (. . .);
```

The iterate { . . . } until (converged ( . . . )) construct iteratively performs a computation until the specified convergence criterion is satisfied. The convergence criterion may be specified as a test that depends on the values of data structures involved in the computation. For example, in the K-means algorithm, discussed in more detail below, the classical convergence criterion is to check whether the data structure that stores memberships of all points is unchanged since the previous iteration. Programmers may specify the computation within each iteration as well as the convergence criteria.

The body of an iteration may be specified using a parallel_iterate construct, which differs from conventional parallel loop constructs (such as parallel_for) in at least two ways. First, a mask is used to indicate which iterations of the loop are optional computations and can hence be dropped. The mask may be a Boolean array with entries that directly correspond to the iterations of the parallel_iterate operator. Second, the batch operator is used to specify that although the loop iterations carry data dependencies, a certain number of iterations may be executed in parallel by ignoring these dependencies. The mask may be produced by a filter operator which uses a filtering criterion that may depend on the values of data structures used in the computation.

An iterative convergence template according to various exemplary embodiments of the present principles may be employed to explore best-effort computing in at least three different ways:

1. The selection of appropriate filtering criteria that reduce the computations performed in each iteration.
2. The selection of convergence criteria that determine when the iterations may be terminated.
3. The use of the batch operator to relax data dependencies in the body of the parallel_iterate.

In addition to providing a programming template, programming may be further eased by providing a domain-specific parallel library to a user. The library may include a plurality of user-selectable best-effort strategies including variable parameters to aid the user in choosing filtering criteria and/or dependency relaxation criteria for the filter operator and/or the parallel iterate operator, for example. Furthermore, the library may be configured to provide suggested best-effort strategies and corresponding suggested parameters for different classes of applications. The suggested parameters may be selected or varied. Moreover, in alternative implementations, the parameters may be open and the user-may simply insert the values of parameters. The parameters may correspond to different convergence criteria, filtering criteria, and/or dependency relaxation criteria and may comprise, for example, thresholds for dropping computations or removing dependencies, as discussed herein with respect to best-effort strategies. Thus, in this way, for example, the library may associate the best-effort strategies and variable parameters with application classes.

It should be understood that although one intent of best-effort computing is to improve performance, the filtering and convergence criteria that are used should be selected such that the additional computation introduced by the criteria do not outweigh the benefits derived therefrom. Further, the criteria chosen should be amenable to highly parallel implementations so that it does not introduce any bottlenecks to parallelism, for example.

Some best-effort strategies that may be implemented in the context of an exemplary iterative convergence template are presented below. For example, the best-effort strategies may be implemented in convergence criteria, filtering criteria, and/or dependency relaxation criteria employed in the template. One such strategy includes Convergence-based Pruning in which data structure convergence may be used to speculatively identify computations that have minimal impact on results and eliminate them. For example, using the iterative convergence programming template, the filter operator may mask off an iterated computation if the result barely changes in the past few iterations.

Another best-effort strategy includes Staged Computation, in which computations may, for example, be organized to proceed in stages. For example, in many conventional clustering applications in which data points are grouped and classified based on similarity or other criteria, a plethora of points are considered in initial processing. According to a staged computations strategy, fewer points may be considered in early stages. Although consideration of fewer points may engender low accuracy of initial estimates of the results, increasingly more points may be considered in subsequent stages so that the initial estimates are refined into more accurate final results. Thus, by considering fewer points in early stages, an overall convergence rate may be expedited while minimally affecting the final result. However, an adequate representative subset of data points should be selected in the initial states to ensure that the convergence rate is accelerated.

Early termination is another best-effort strategy that may be implemented in various exemplary embodiments of the present principles. In accordance with an early termination strategy, statistics may be aggregated to estimate accuracy and terminate the iteration process before absolute convergence. Fewer iterations are computed at the expense of partial convergence. The termination criteria may be encoded by the converged operator in the programming template.

A different best-effort strategy includes Sampling, in which a random or pseudo-random subset of input data is selected and used to compute the results. Conversely or equivalently, a random or pseudo-random subset of input data is selected as best-effort computations and dropped. The Sample strategy is useful, for example, when significant redundancy is expected in the input data. Otherwise, a great portion of input information may be lost during computation, and accuracy may degrade drastically.

Dependency Relaxation is yet another best-effort strategy that may be implemented in various exemplary embodiments of the present principles. In accordance with dependency relaxation, potentially redundant dependencies may be ignored across iterations. Iterations may then be parallelized, leading to more degrees of parallelism or coarser parallel granularity in which threads have larger tasks or a larger number of tasks, for example. Coarser granularity of parallelism obscures the overhead in task and thread management.

It should be understood that the above-recited best-effort strategies may be used in combinations. For example, Sampling may be employed to select a subset of input data before any other strategies are applied. In addition, Early Termination may be combined with Staged Computation as a relaxed criteria that determines when to advance to the next stage. Furthermore, Convergence-based Pruning may be added to reduce the amount of computation in each stage. Alternatively, some best-effort strategies may be made probabilistic, as discussed below with respect to K-means applications, for example.

The optimal strategy selected may vary depending on characteristics of the algorithm class as well as its input data. The iterative convergence template permits easy evaluation of different strategies, the implementation of which can be handled using run-times and libraries, for example, allowing application programmers to efficiently determine and implement the best strategy or combination of strategies for each application they are coding.

Figure 3:
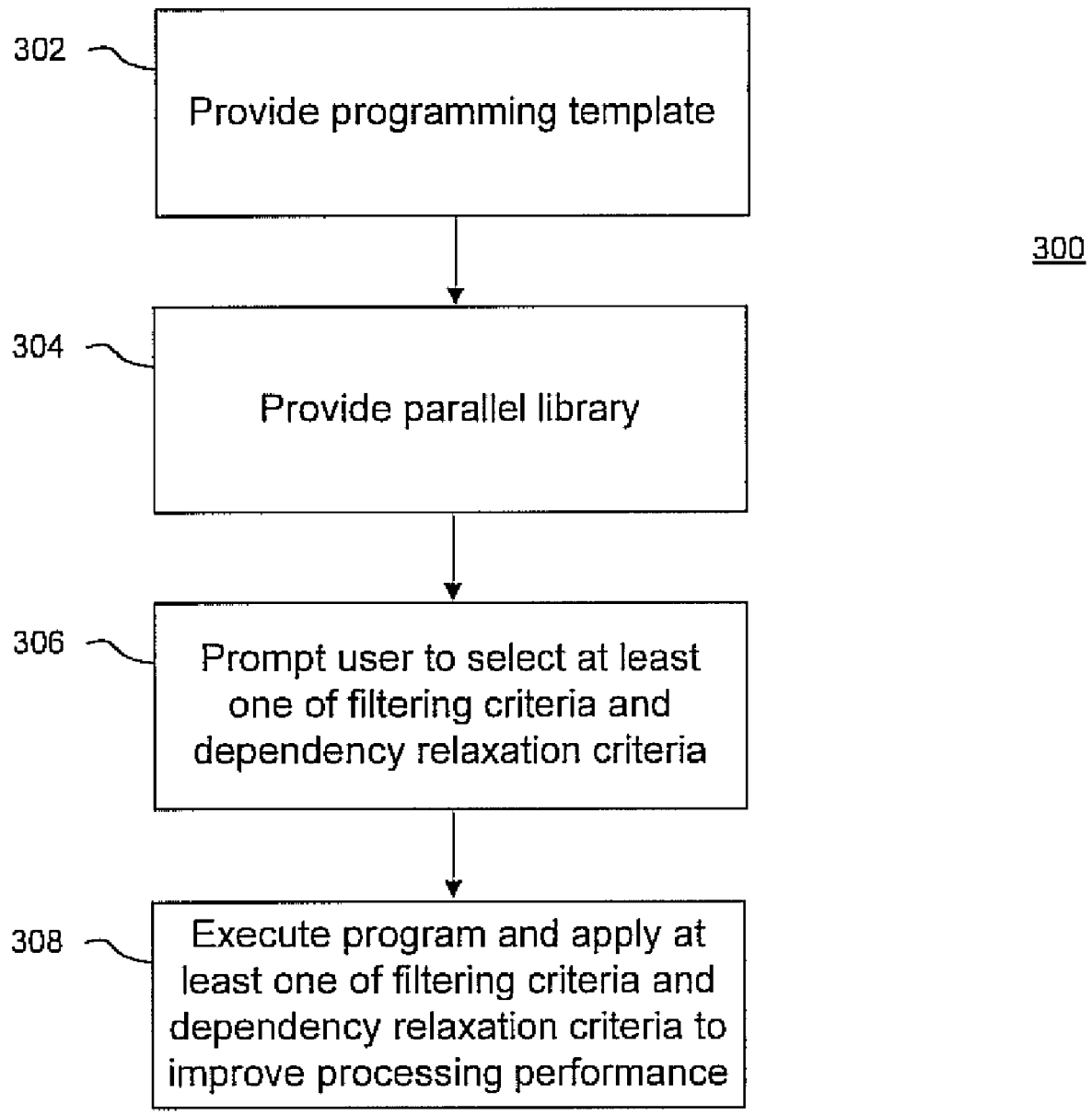
FIG. 3 is a high-level block/flow diagram of an exemplary method for improving parallel processing performance by implementing a best-effort architecture within an application program in accordance with aspects of the present principles.

With reference now to FIG. 3, a high-level block/flow diagram of a method 300 for implementing a best-effort scheme within an application in accordance with an exemplary embodiment of the present principles is illustrated. Method 300 may begin at step 302 in which a programming template for generating an application may be provided. For example, the programming template illustrated in Table 1 may be provided to a user.

Optionally, at step 304, a parallel library that includes a plurality of user-selectable best-effort strategies including variable parameters may be provided to aid the user in choosing one or more of filtering criteria and/or dependency relaxation criteria associated with the user-selectable best-effort strategies. For example, the parallel library may be the domain-specific parallel library described above.

At step 306, a user may be prompted to select one or more of filtering criteria and/or dependency relaxation criteria. For example, the programming template illustrated in Table 1 may be presented to a user. Here, the user may choose or set the filter criteria for the filter operator. In addition, the user may choose or set parameters for the batch operator to relax dependencies in the body of the parallel_iterate operator. The filter criteria is applied to determine best-effort application computations that need not be executed. As discussed above, best-effort computations that need not be executed may be dropped despite the existence of processing capability to execute the best-effort computations. Further, the dependency relaxation criteria is applied to determine removable dependencies between application computations.

At step 308, the program may be executed after the user completes the programming template. Accordingly, one or both of the filtering criteria and the dependency relaxation criteria may be applied to implement a best-effort computing architecture and thereby improve processing performance.

Recognition and Mining Application Examples

Many characteristics of iterative convergence algorithms in the Recognition and Mining (RM) domain make them naturally suited to best-effort computing. Some RM applications permit computers to model objects or events of interest to the user and use such models to search through massive amounts of data. RM applications share several unique characteristics:

1) the input data is noisy and it often includes significant redundancy;
2) computations performed on the input data are statistical in nature; and
3) some degree of imprecision in the output is acceptable, as a large number of seemingly different solutions are produced that are all considered acceptable.

These characteristics are collectively referred to herein as the "forgiving nature" of 1M applications.

A large class of RM algorithms are iterative-convergence algorithms. Thus, to better illustrate some exemplary aspects of the present principles, best-effort schemes that are implemented within two types of RM applications, K-means and General Learning Vector Quantization (GLVQ), are described herein below.

K-means is a widely used clustering algorithm and is also often used for unsupervised learning. GLVQ is a classification algorithm used in supervised learning, where the underlying data structure, a set of reference vectors, is updated as labeled training vectors are processed. Although only these two algorithms are considered herein, several other algorithms, including Fuzzy K-means, Support Vector Machines, Neural Networks, and Principal Component Analysis, for example, are similar and aspects of the present principles may be applied to them as well. For example, the other algorithms exhibit similar structure to K-means and GLVQ in that parallel computations are repeatedly performed to update values of data structures until a pre-specified convergence criterion is satisfied.

In the examples provided below, image segmentation is conducted using K-means clustering to perform eye detection in images. In each case, various implementations of a programming template are employed to institute best-effort strategies. For the K-means application, processing performance may be improved by reducing the raw computation work load while for the GLVQ application processing may be improved by using best-effort computing to eliminate task dependencies. Reduction in dependencies leads to increased parallelism in the workload, thereby improving performance. It can be shown that using best-effort strategies may accelerate the processing rate by 3.5 times and 4.3 times as compared to traditional K-means parallel implementations and traditional GLVQ implementations, respectively. In both cases, the performance improvements may be obtained with very minimal impact on the quality of the results.

K-Means Application

K-means is a widely used algorithm that clusters a given set of points in a multi-dimensional space. It begins by randomly picking K input points as cluster centroids. It then executes a number of iterations wherein the cluster centroids are then refined and points are associated with the cluster that has the centriod that they are closest to. The iterations are performed until an iteration no longer changes any point's cluster assignment. Each iteration of K-means performs three steps:

1. Compute the distance between every point and every cluster centroid,
2. Assign each point to the cluster centroid that it is closest to. All points assigned to a cluster centroid form a single cluster.
3. Re-compute the new centroid for each cluster to be the mean of all points in the cluster.

A common application of K-means clustering is to segment images into regions with similar color and texture characteristics. Image segmentation can be used as a pre-processing step for image content analysis or compression. K-means may be utilized to perform image segmentation by clustering all the pixels in an RGB color space from an image, each of which may correspond to a point in the K-means clustering algorithm.

It can be shown that, on average, less than 1% of points change their memberships after around 20% of the iterations.

Thus, after a point p whose membership has stabilized, all distance and membership computations involving point p in subsequent iterations will not have any impact on the final result. Thus, membership computation may be removed from future iterations for points that have already stabilized. In practice, it is difficult to identify points that are guaranteed to not change clusters by simply observing their cluster membership for a limited number of iterations. For example, due to a gradual change in cluster centroids, a point may not change clusters for several iterations but may eventually move to a different cluster. However, experiments show it is possible to identify points that will be highly unlikely to change clusters, and the associated computations (distance computations for these points) are likely to have a minimal impact on the final result. These computations can be presented to the computing platform as optional computations and dropped in order to improve performance.

From a different perspective, it can be shown that cluster centroids tend to migrate drastically during the first several iterations, which implies that these iterations do not demand very high accuracy in centroid computation. Therefore, it is possible that not all points have to be considered in the early iterations, and, as such, a Staged Computation best-effort strategy may be an appropriate choice to improve processing performance for a K-means application.

Table 2 is a representation of an application after selections have been made by a user employing an exemplary best-effort parallel template with a K-means application in accordance with an implementation of the present principles.

TABLE 2

```
points[1:N], centroids[1,K];  /*N points, K clusters (or centroids) */
memberships[1:N];             /* cluster memberships */
distances[1:K];               /* distances from point to centroids*/
Kmeans_best_effort( ) {
   centroids[1:K]= random_select(points, K);/*randomly choose
   K points as centroids*/
   iterate {
      Mask mask[1:N]= filter (memberships[1:N], filter_strategy);
      /*generate mask*/
      /*compute only on un-masked points*/
      parallel_iterate (i=1 to N with mask [1:N] batch N) {
         distances[1:K] = copute_distances(points[i], centroids[1:K]);
         memberships[i] = armin(distances[1:K]);
      }
      /*update cluster centroids - parallel reduction */
      centroids[1:K]= compute_means(points[1:N], memberships[1:N]);
   } until converged (memberships, unchanged);/* test for convergence*/
}
```

With continuing reference to Table 2, generally stated, the K-means algorithm addresses the problem of clustering n points into K clusters. The data structures used in the algorithm are arrays that store the points, cluster centroids, distances of each point to the cluster centroids, and the cluster memberships. Initially, K random points are chosen as centroids. Each cluster has exactly one centroid. The function random_select ( ) selects K random points. Then, depending on the specific filter strategy, filter_strategy, that is used for filtering, the filter function, filter( ), generates a mask array such that mask [i]=1 means that the $i^{th}$ point will be considered for further computation during the current iteration. In other words, the computations involving point i are guaranteed computations. Computations involving points whose entries in the mask [ ] array is 0 are optional or best-effort computations. The filtering criterion may, for example, be based on the number of iterations for which a point has remained in the same cluster. Additionally, the parallel_iterate loop may be configured to only process points whose mask value is 1.

In the case of K-means, the batch operator is given the parameter N, as all iterations of this loop are independent. The function compute_distances ( ) may be configured to compute the distance of the $i^{th}$ point from all the K centroids. The function argmin ( ) may be configured to compute the index of the centroid that is closest to the $i^{th}$ point. The $i^{th}$ point is then assigned to the cluster corresponding to the closest centroid. Thereafter, the compute_means ( ) function may be configured to compute the new centroid for all points in a cluster. Finally, depending on the specific best-effort convergence criteria in place, the function converged ( ) may determine when to terminate the K-means algorithm. The original K-means convergence criterion, which is illustrated in the psuedo-code, is to check whether the values of the memberships [ ] array are unchanged since the previous iteration.

In one exemplary embodiment of the present principles, as described herein below, five different best-effort filtering criteria and one best-effort convergence criterion may be employed to improve processing performance of a K-means algorithm through either a parallel programming template or a best-effort computation layer. It should be understood that in these exemplary embodiments, all the filtering criteria are fully parallel, i.e., they can be evaluated independently on each point, so that computations added for best-effort purposes do not become parallel execution bottlenecks. The convergence criterion is a parallel reduce operation, similar to the original convergence criterion of the K-means algorithm.

The strategies for the exemplary K-means best-effort implementation presented below are parameterized. In both parallel programming template and best-effort computation layer embodiments, a generic run-time library, such as library 104 of FIG. 1, may implement these strategies. In exemplary parallel template embodiments, the application programmer needs only to instantiate the appropriate strategy and choose values of the parameters, thereby facilitating experimentation with different strategies and parameter values by the programmer.

In accordance with the exemplary K-means implementation, Early Termination, Sampling, Staged Computation, Convergence-based Pruning best-effort strategies may be employed. For example, with regard to the Early Termination strategy, the algorithm may terminate when the percentage of unstable points—points that changed their memberships in the last iteration—drops below a given threshold. For example, the convergence criterion may be made to return True when less than T % of the points have changed their membership since the last iteration. Thus, computation processing may be terminated when the percentage of input data that changes across iterations falls below a threshold.

With respect to the Sampling best-effort strategy, Sampling can be applied to K-means by employing the filter operator to choose the same subset of input data in all iterations when the cluster centroids are computed. The centroids are eventually used to compute membership for all the points. Thus, P % of the n points may be randomly sampled. For all sampled points, corresponding mask bits in the mask [ ] array may be set to 1 so that these points participate in computations during the current iteration.

Concerning the Staged Computation best-effort strategy, the filter operator may be configured to choose only a subset of points initially. Points may thereafter be gradually added to the subset in stages to refine the result. For example, the mask [ ] array may initially be set to 1 for only $$\frac{1}{256}$$

of the n points. The number of points considered may grow geometrically for subsequent stages. For example, a total of 5 stages may be deployed, where the final stage considers all the points. The algorithm may advance to the next stage when the convergence criterion evaluates to True in the previous stage.

Further, three types of Convergence-based pruning may be utilized in the exemplary best-effort K-means implementation: conv.point, conv.center and conv.vacation. For example, in a conv.point strategy, the filter operator can mask off the computation for a point's membership if the membership barely changes in the past iterations. Thus, the filtering criterion may identify points whose memberships have remained the same in the last N iterations. In this way, for example, fields in data structures that have values which vary across iterations to an extent that is within a threshold may be identified and dropped. The mask [ ] array entries may be set to 0 for points that are deemed to have "converged" and to 1 for all other points.

For a conv.center strategy, a computation may be masked off if a point is assigned to a cluster with a centroid that hardly migrates. Accordingly, the filtering criterion may identify points whose corresponding centroids have changed by a distance of greater than D since the previous iteration. The mask [ ] array entries may be set to 1 for such points and 0 for all other points. It should be noted that the input dataset may be transformed to have zero mean and unit variance using the z-score transformation. The distance measurement may be based upon this normalized space.

With respect to a conv.vacation strategy, a heuristics measure may be used to determine for each point, how many iterations of membership computation can be bypassed before recomputing it again. The number of bypassed iterations is referred to as vacation length ($\beta$). The heuristic may be modeled as a function of the distinguishing degree ($\alpha$) that quantifies how distinguishing the point's current cluster membership is, and the likelihood that it is going to be affected by an updated centroid. It is defined as $$\alpha = \frac{D_s - (D_m + \delta)}{D_s + D_m + \delta},$$

where $D_m$ is the distance of the point to its nearest centroid, $D_s$ is the distance to its second nearest centroid, and $\delta$ is the offset distance of the centroid that moved the most in the previous iteration. It can be shown that selecting $\beta = \max(13.5 \times \alpha - 2.7, 0)$ provides a good tradeoff between performance and accuracy.

It can be shown that each of the best-effort strategies described above with respect to the exemplary K-means implementation reduce execution time at the expense of minimal loss in accuracy. Further, it can also be shown that combined strategies have more performance gains at a lower error rate relative to individual strategies. Thus, implementing best-effort strategies in accordance with the description provided above with a K-means algorithm provides significant performance improvements due to reductions in computational workload with very small impact on the quality of the result. Moreover, the computations introduced by the various best-effort strategies are highly parallel and do not impact the excellent parallel scaling behavior of the K-means algorithm.

GLVQ Application

As mentioned above, another example of an RM application is a GLVQ application, which employs a supervised learning algorithm that is used for classification. During classification, the application calculates the distance between the input vector and all pre-specified reference vectors. It should be noted that the training phase of the GLVQ algorithm creates reference vectors for each class. The input vector is assigned to the class with the nearest reference vector.

The training phase of the GLVQ algorithm is computation intensive. As such, a best-effort architecture may be implemented in the GLVQ training phase to improve processing performance by applying any one or more best-effort strategies, as discussed above. During the training phase, the application processes one training vector at a time. The application performs the following three steps for each training vector;

1. Compute distances between the training vector and all reference vectors.
2. Identify two reference vectors: (a) the closest reference vector R1 in the same labeled class as the training vector, and (b) the closest reference vector R2 that is not in the same labeled class as the training vector.
3. Suitably update the two reference vectors so that R1 is moved closer to the training vector and R2 is moved farther away from it.

This process is continued until all training vectors have been evaluated.

The training vectors may be processed sequentially because of a read-after-write (RAW) dependency, wherein reference vectors updated by a training vector will be used to calculate distances from the next training vector. However, most of the distance values have no impact on the selection of the two closest reference vectors in the second step. Only the two selected reference vectors will participate in the third step; other reference vectors are not used or updated. Therefore, in the case that two consecutive training vectors update different reference vectors, this inter-iteration RAW dependency becomes redundant.

To illustrate the potential for best-effort computing in the GLVQ training algorithm, the dependencies between computations are characterized in consecutive iterations, wherein each iteration corresponds to processing one training vector. Inter-iteration dependencies may be classified into true dependencies, where ignoring the dependency would have a relatively large impact on the result of the next iteration, and false dependencies, where ignoring the dependency would have relatively little or no impact on the result of the next iteration. Note that a true dependency occurs only when two consecutive iterations update the same reference vector.

In accordance with various exemplary aspects of the present principles, the probability of true inter-iteration dependencies may be viewed as the probability that executing consecutive iterations in parallel, for example, by ignoring the dependencies, would affect the result. The characterization may be performed when GLVQ is used in the context of eye detection in images, which is an important step in face recognition, where the classifications may be images of "eyes" and images of "non-eyes."

It can be shown that probability of true dependencies between consecutive iterations or, equivalently, the probability of incorrect dependency relaxation if consecutive iterations are executed in parallel by ignoring potential dependencies, is less than 30% even when vectors are processed in parallel batches of 10 each. Here, training vectors are grouped into batches of N vectors, where each vector in a batch is assigned to one of N parallel threads. Further, due to the redundancy present in most training data sets, any discrepancies due to incorrectly ignored dependencies are very likely to be rectified by following training vectors. Thus, processing performance may be improved by parallelizing across training vectors, while maintaining a reasonable modeling accuracy. It can be shown that parallelizing training vectors by ignoring potential dependencies between the associated computations leads to almost negligible impact on the accuracy of classification, which is the cad-objective of the GLVQ algorithm. Accordingly, as the number of processors increases, parallelism across training vectors should scale much better than current approaches that parallelize only distance computations across reference vectors.

Table 3 is a representation of an application after selections have been made by a user employing an exemplary best-effort parallel template with a GLVQ application in accordance with an implementation of the present principles.

TABLE 3

```
int C, M, N;           /*C classes, M reference vectors per class,
N training vectors */
ref_vecs[1:C][1:M];    /*reference vectors*/
train_vecs[1:N];       /*training vectors*/
labels[1:N];           /*class labels*/
int P;                 /*No. of training vectors to process in parallel */
GLVQ_train_best_effort( ) {
  iterate {
    Mask mask[1:N] = filter (NONE); /*sets all mask entries to 1 */
    parallel_iterate (i = 1 to N with mask[1:N] batch P) {
      /* calculate distances from training vector to all reference vectors*/
      distances[1:C][1:M]= euclid (ref_vecs[1:C][1:M], train_vecs[i]);
      /*pick two reference vectors, one from correct class, one
      from other classes*/
      target_ref, other_ref= choose_nearest_vectors(labels[i],
      ref_vecs[1:C][1:M],
              distances[1:C][1:M]);
      /*update the chosen reference vectors */
      update_refs (target_ref, other_ref, distances[1:c][1:M]);
    }
  } until converged ( TRUE ); /* only one pass through training vectors*/
}
```

The GLVQ training application illustrated in Table 3 processes N training vectors that are provided with corresponding labels that denote the class that each belongs to. A set of M reference vectors is created for each of the C classes. Since the algorithm only makes a single pass through the training vectors, the convergence criterion for the iterate operator is set to TRUE. The parallel_iterate operator may be configured to iterate through the training vectors and process them in parallel batches of P vectors such that it relaxes any data dependencies between the P vectors that are in the same batch. Dependencies across batches may be maintained.

In each iteration, the following computations may be performed. The function euclid ( ) may be configured to compute the Euclidean distances from the $i^{th}$ training vector to all reference vectors in all classes. Based on these distances, the function choose_nearest_vectors ( ) may be configured to select two reference vectors—one from the correct class that is closest to the current training vector, and one from among all the incorrect classes that is closest to the current training vector. The function update_refs ( ) may be configured to update the two selected reference vectors so that the former is pushed closer to the current training vector while the later is pushed away from it. The algorithm may terminate when all the training vectors have been processed.

GLVQ is conventionally parallelized by using multiple threads to perform distance computation from the training vector to all the reference vectors and finding the two closest reference vectors. However, in many application scenarios a limited number of reference vectors encumbers effective parallelism. In the example of eye detection, a total of 128 reference vectors are present. With S threads, each thread calculates distances to only 16 reference vectors. As a result, the benefit of parallel execution is significantly reduced due to the overheads of parallel task creation and management.

In accordance with the exemplary implementation of the present principles described in Table 3, the use of the parallel_iterate operator exploits more parallelism and enforces a larger parallel granularity by relaxing dependencies between iterations that process consecutive training vectors. Although there is a risk that accuracy may be lost as a result of relaxation of RAW data dependencies that may occasionally be present, it can be shown that the loss in accuracy which results from relaxing data dependencies is very small and hence acceptable.

It should be noted, however, that with increasing parallelism, more dependencies maybe ignored and some form of re-computation for dependent training vectors may become necessary. Thus, in some implementations of the present principles, data dependencies may be detected and the dependent iterations may be re-executed sequentially. For example, the data dependencies may be detected by determining that multiple iterations in a parallel batch update the same reference vectors.

For the best-effort GLVQ implementation, accuracy may vary due to the non-determinism introduced by the enforcement of parallelism for dependent computations. However, it can be shown that implementation of a best-effort computing scheme with a GLVQ algorithm as discussed above results in a significant improvement in processing speed that is 4.3 times the processing speed of a conventional parallel implementation with almost no penalty in accuracy. Thus, best-effort strategies can be used with GLVQ training applications to improve parallel scalability by exposing parallelism at a granularity that is much better suited to the underlying platform.

Accordingly, as discussed above, implementations of best-effort computing systems will lead to faster and more scalable realizations of applications on parallel hardware platforms. Furthermore, best-effort computing also may provide the ability to build elasticity into computing systems through tradeoffs between performance and fidelity or accuracy of the end-result of computations. Accordingly, the present principles provide a significant advantage over existing processing systems by improving processing speed and performance with a minimal effect on accuracy.

It should be noted that aspects of embodiments described herein may be entirely hardware or including both hardware and software elements. In a preferred embodiment, the present principles are implemented in software with a processing platform. The software includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. The medium can be magnetic, optical, electronic, electromagnetic, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Having described preferred embodiments of systems and methods for improving processing performance (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A best-effort parallel processing system comprising:
a processing platform including at least one processor configured to execute application computations;
an application layer that comprises at least one application that is executed on the processing platform; and
a best-effort computation layer between the application layer and the processing platform that is configured to classify a set of computations requested by the application layer as either guaranteed computations, which are assuredly executed by the processing platform, or best-effort computations,
wherein the set of computations includes at least a subset of computations that modify a first set of parameters based on a second set of parameters,
wherein the application layer and the best-effort computation layer are configured such that the best-effort computation layer receives from the application layer a request that a first computation, from the subset of computations, directed to a first parameter from the second set of parameters be performed before a second computation, from the subset of computations, directed to a second parameter from the second set of parameters,
wherein the best-effort computation layer is further configured to classify the first and second computations as best-effort computations in response to determining that a parameter from the first set of parameters that has a closest distance, of the first set of parameters, to the first parameter is different from a parameter from the first set of parameters that has a closest distance, of the first set of parameters, to the second parameter,
wherein the best-effort computation layer is further configured to perform re-ordering of the first and second computations such that a dependency between the first and second computations is not maintained.

2. The system of claim 1, wherein the best-effort computation layer is further configured to ensure that the guaranteed computations are executed by reinitiating the execution of guaranteed computations which have not been completed.

3. The system of claim 1, wherein the best-effort computation layer is a parallel run-time library that accepts computations from a parallel-programming application programming interface (API).

4. The system of claim 1, wherein the best-effort layer includes a parallel programming application programming interface (API) that implements an iterative-convergence template that iteratively updates the values of one or more data structures until a specified convergence criterion is satisfied.

5. The system of claim 1, wherein the best-effort computation layer is further configured to determine best-effort computations by identifying fields in data structures that have values which vary across iterations to an extent that is within a threshold.

6. The system of claim 1, wherein the best-effort computation layer is further configured to classify best-effort computations such that quantities of input data are processed in a staged manner.

7. The system of claim 1, wherein the best-effort computation layer is further configured to classify best-effort computations such that a randomly selected sub-set of input data are processed.

8. The system of claim 1, wherein the best-effort computation layer is further configured to classify best-effort computations such that an iterative execution of best effort computations of a second subset of the set of computations is terminated before a convergence criterion specified in the at least one application is satisfied.

9. A method for implementing a best-effort architecture within a computing system comprising:
intercepting requests for a set of computations from an application that are intended for a processing platform, wherein said set of computations includes a subset of computations that modify a first set of parameters based on a second set of parameters, wherein at least one of the requests indicates that a first computation, from the subset of computations, directed to a first parameter from the second set of parameters be performed before a second computation, from the subset of computations, directed to a second parameter from the second set of parameters;
classifying the set of computations as either guaranteed applications, which are assuredly executed by the processing platform, or best-effort computations, wherein the classifying includes classifying the first and second computations as best-effort computations in response to determining that a parameter from the first set of parameters that has a closest distance, of the first set of parameters, to the first parameter is different from a parameter from the first set of parameters that has a closest distance, of the first set of parameters, to the second parameter; and
directing guaranteed computation requests to the processing platform and re-ordering the first and second computations such that a dependency between the first and second computations is not maintained.

10. The method of claim 9, further comprising:
reinitiating execution of mandatory computations which have not been completed.

11. The method of claim 9, further comprising:
terminating computation processing before a convergence criterion specified in the application is satisfied.

12. The method of claim 9, wherein the classifying further comprises classifying computations as best-effort computations by identifying fields in data structures that have values which vary across iterations to an extent that is within a threshold.

13. The method of claim 9, wherein the classifying further comprises classifying computations as best-effort computations such that quantities of input data are processed in a staged manner.

14. The method of claim 9, wherein the classifying further comprises selecting a random subset of the set of computations as the best-effort computations.

15. A method for improving parallel processing performance by implementing a best-effort architecture within an application program comprising:
providing a programming template for generating the application program;
prompting a user to select dependency relaxation criteria; and executing the program and applying the dependency relaxation criteria to improve processing performance,
wherein the executing the program and the applying the dependency criteria comprises evaluating a set of computations that modify a first set of parameters based on a second set of parameters and that indicate that a first computation, from the set of computations, directed to a first parameter from the second set of parameters be perfoiined before a second computation, from the set of computations, directed to a second parameter from the second set of parameters, and re-ordering the first and second computations such that a dependency between the first and second computations is not maintained in response to determining, in accordance with the dependency relaxation criteria, that a parameter from the first set of parameters that has a closest distance, of the first set of parameters, to the first parameter is different from a parameter from the first set of parameters that has a closest distance, of the first set of parameters, to the second parameter.

16. The method of claim 15, further comprising:
providing a parallel library that includes a plurality of user-selectable best-effort strategies including variable parameters to aid the user in choosing the dependency relaxation criteria.

17. The method of claim 16, wherein the parallel library is domain specific and associates the best-effort strategies and variable parameters with application classes.

* * * * *